US011153667B2

(12) United States Patent
Kim et al.

(10) Patent No.: US 11,153,667 B2
(45) Date of Patent: Oct. 19, 2021

(54) TWIN WAVELENGTH SELECTIVE SWITCH

(71) Applicant: INLC TECHNOLOGY CO., LTD., Daejeon (KR)

(72) Inventors: Tae Hwan Kim, Daejeon (KR); Seong Woo Suh, Daejeon (KR); Seong Min Kang, Daejeon (KR)

(73) Assignee: INLC TECHNOLOGY CO., LTD., Daejeon (KR)

(*) Notice: Subject to any disclaimer, the term of this patent is extended or adjusted under 35 U.S.C. 154(b) by 0 days.

(21) Appl. No.: 16/657,486

(22) Filed: Oct. 18, 2019

(65) Prior Publication Data
US 2021/0120320 A1 Apr. 22, 2021

(51) Int. Cl.
*H04Q 11/00* (2006.01)
*H04J 14/02* (2006.01)

(52) U.S. Cl.
CPC ...... *H04Q 11/0005* (2013.01); *H04J 14/0212* (2013.01); *H04Q 2011/0015* (2013.01); *H04Q 2011/0016* (2013.01)

(58) Field of Classification Search
CPC .......... G02B 6/3518; G02B 6/2706; G02B 6/29311; G02B 6/351; G02B 6/3544; G02B 6/3546; G02B 6/3554; G02B 6/356; G02B 6/3592; H04Q 11/0005; H04Q 2011/0026; H04Q 2011/0035; H04Q 2011/0015; H04Q 2011/0016; H04J 14/0212
USPC ..... 398/43–88; 385/16, 18, 33, 36; 359/877, 359/484.06, 388
See application file for complete search history.

(56) References Cited

U.S. PATENT DOCUMENTS

| 9,654,848 B2* | 5/2017 | Frisken .......... H04J 14/06 |
| 2002/0122251 A1* | 9/2002 | DeBoynton ...... G02F 1/31 359/484.06 |
| 2008/0240650 A1* | 10/2008 | Shibata .......... G02B 6/352 385/18 |

(Continued)

FOREIGN PATENT DOCUMENTS

WO WO 2019/004510 A1 1/2019

OTHER PUBLICATIONS

Gao et al.; 1X25 LCOS based wavelength selective switch with flexible passbands and channel selection; Optical fiber technology, Jun. 2018; pp. 1-6. (Year: 2018).*

(Continued)

*Primary Examiner* — Amritbir K Sandhu
(74) *Attorney, Agent, or Firm* — Stein IP, LLC

(57) ABSTRACT

A wavelength selective switch (WSS) apparatus. The WSS apparatus includes: a plurality of input/output port groups; a plurality of switching lens parts; a plurality of wedge prism parts; a beam expansion part; a wavelength dispersion part; a path combining part configured to combine the groups of the plurality of light beams transmitted from the switching lens parts on the dispersion axis; an imaging optic part; and a switching unit including a plurality of surface areas corresponding to the plurality of input/output port groups, the switching unit being configured to angular displace an angle of a selected wavelength on the switching axis such that the wavelength selected from multiple wavelength channels of an input port selected independently for each of the plurality of input/output port groups is transmitted to an output port of the plurality of input/output port groups selected independently.

12 Claims, 9 Drawing Sheets

(56) References Cited

U.S. PATENT DOCUMENTS

| | | | | |
|---|---|---|---|---|
| 2009/0220233 | A1* | 9/2009 | Presley | G02B 6/3544 |
| | | | | 398/79 |
| 2012/0236216 | A1* | 9/2012 | Sharma | G02B 26/02 |
| | | | | 349/1 |
| 2013/0329145 | A1* | 12/2013 | Suh | G02B 5/30 |
| | | | | 349/33 |
| 2014/0321796 | A1* | 10/2014 | Ohtsuka | G02B 6/356 |
| | | | | 385/3 |
| 2015/0139642 | A1* | 5/2015 | You | H04Q 11/0005 |
| | | | | 398/48 |
| 2015/0208144 | A1* | 7/2015 | Holmes | H04Q 11/0003 |
| | | | | 398/48 |
| 2015/0212275 | A1* | 7/2015 | Mao | G02B 6/3546 |
| | | | | 385/11 |
| 2016/0234574 | A1* | 8/2016 | Wagener | H04J 14/0212 |
| 2016/0234576 | A1* | 8/2016 | Suh | G02B 6/3534 |
| 2018/0059431 | A1* | 3/2018 | Yang | G02F 1/1393 |
| 2018/0299744 | A1* | 10/2018 | Suh | G02F 1/31 |
| 2018/0314010 | A1* | 11/2018 | Thylen | G02B 6/29338 |
| 2019/0327015 | A1* | 10/2019 | Schimpe | G02B 6/29382 |
| 2020/0073056 | A1* | 3/2020 | Suh | G02B 6/3544 |

OTHER PUBLICATIONS

Gao et al.; 1X25 LCOS-based wavelength selective switch with flexible passbands and channel selection; May 2018; Optical fiber technology; pp. 1-6. (Year: 2018).*

Gao et al.; 1 X 25 LCOS based wavelength selective switch with flexible passbands and channel selection; Jun. 2018, optical fiber technology; pp. 1-6. (Year: 2018).*

* cited by examiner

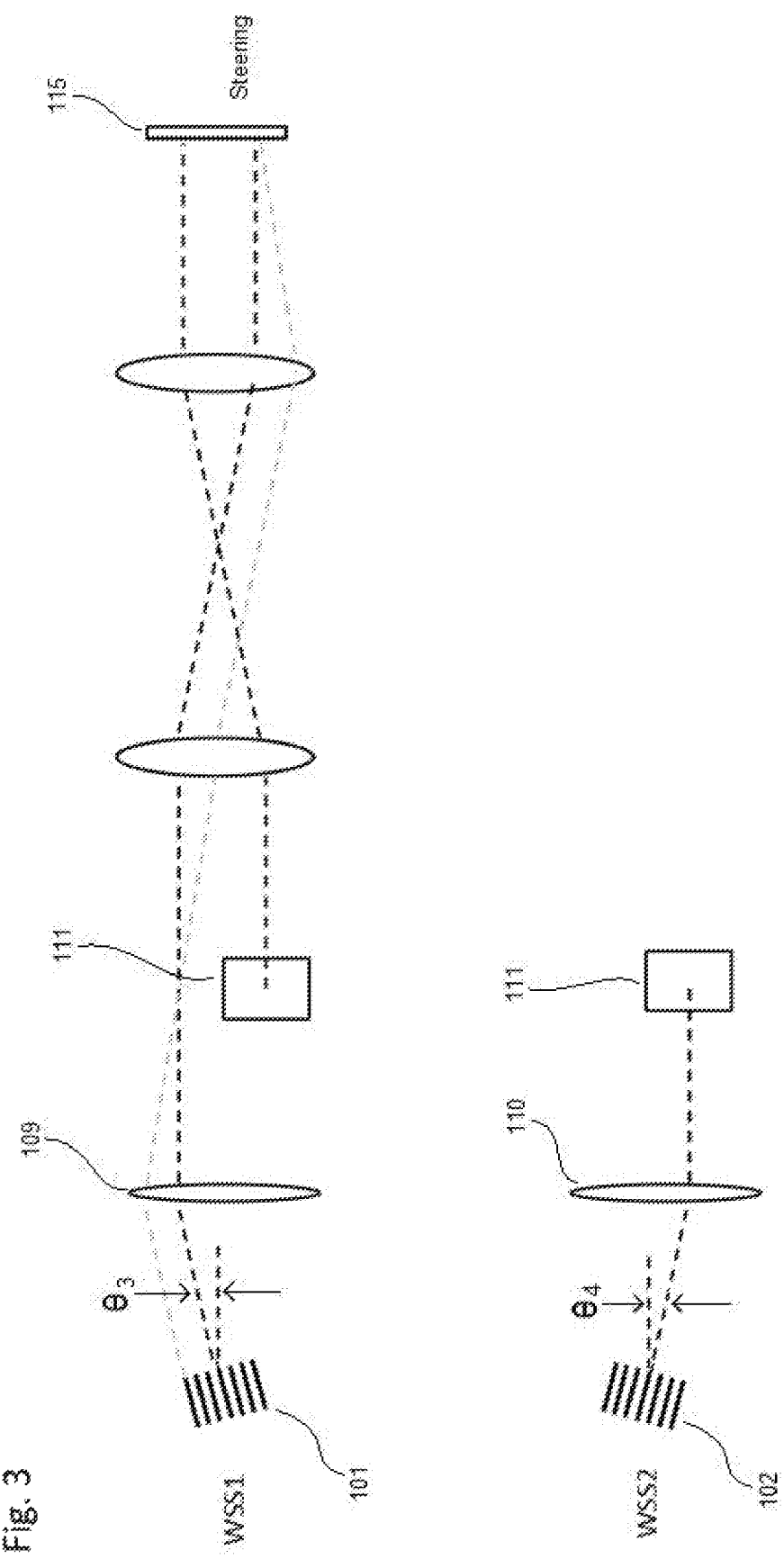

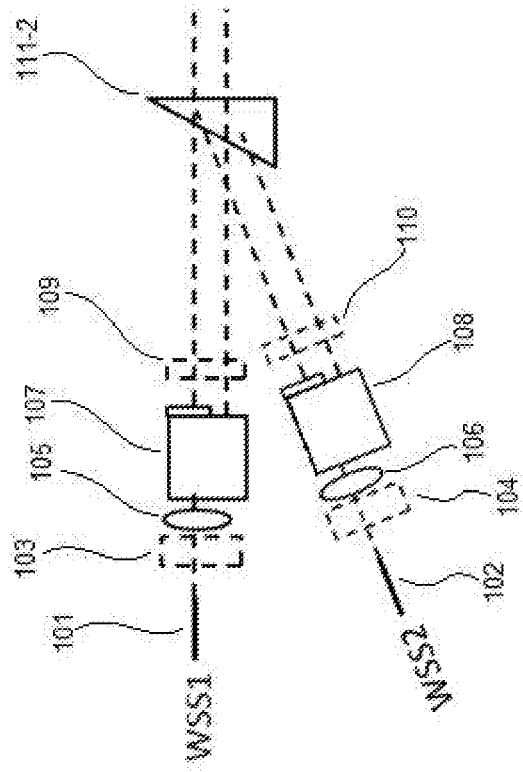
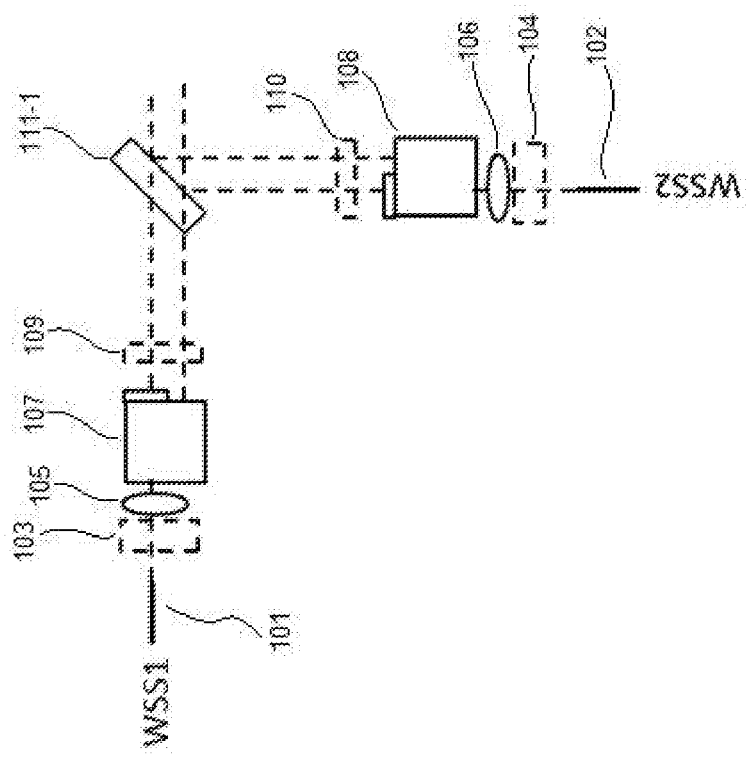

TWIN WAVELENGTH SELECTIVE SWITCH

BACKGROUND OF THE INVENTION

1. Field of the Invention

The present subject matter relates generally to a wavelength selective switch (WSS) apparatus, and more specifically, to a WSS apparatus including a path combining part configured to combine the groups of a plurality of light beams on a dispersion axis.

2. Description of the Related Art

In optical communications systems, the use of wavelength selective witching for applications of optical cross-connects has attracted much interest because of the goal of fully flexible, networks where the paths of each wavelength can be reconfigured to allow arbitrary connection between nodes with the capacity appropriate for that link at a particular point in time.

Conventional wavelength selective switches expand light beams output from an input port on a dispersion axis before transmitting the same to a diffraction grating. The diffraction grating disperses the wavelength components of each input beam. The light beams dispersed by the diffraction grating are transmitted to a switching unit, which in turn transmits the light beams to targeted output port arrays by aiming the light beams at predetermined angles that have been set according to their wavelengths. The switching unit includes a plurality of subunits for selecting wavelengths in which each of the plurality of subunits is equipped with a corresponding lens to suppress the increase in size of the device. However, multiple lenses may increase the length of time and the number of processes in manufacturing the device. Moreover, optical blind zones which can be created in an area between neighboring lenses may increase the size of the wavelength selective switch.

Recently, alternative wavelength selective switches for multiple units are proposed to address the aforementioned technical shortcomings of conventional wavelength switches. An example of these wavelength switches is disclosed in WO 2019/004510, which is equipped with two prism parts, thereby reducing the manufacturing time and processes, removing optical blind zone, and effectively lowering the height of the device. However, as schematically illustrated in FIG. 1, when the number of input/output ports is increased, the total length of the port array is increased accordingly, and so is the size of the entire module.

SUMMARY OF THE INVENTION

An aspect of the present subject matter is directed to a wavelength selective switch (WSS) apparatus that includes: a plurality of input/output port groups including a plurality of input/output port arrays which transmit a plurality of light beams each including a predetermined channel, the plurality of input/output port groups being separated from one another in a dispersion axis; a plurality of switching lens parts configured to converge the plurality of light beams transmitted from the plurality of input/output port arrays such that the plurality of light beams intersect on a switching axis; a plurality of wedge prism parts each of which is arranged between one of the plurality of input/output port arrays and one of the plurality of switching lens parts, the plurality of wedge prism parts being configured to refract the plurality of light beams transmitted from the plurality of input/output port arrays into different angles on the switching axis according to groups to which the plurality of light beams belong; a path combining part which is placed after the plurality of switching lens parts and configured to combine the groups of the plurality of light beams transmitted from the switching lens parts on the dispersion axis; a wavelength dispersion part configured to disperse wavelength components of the light beams at different angles on the dispersion axis; an imaging optic part configured to readjust and focus the wavelengths of the light beams split by the wavelength dispersion part; and a switching unit including a plurality of surface areas corresponding to the plurality of input/output port groups, the switching unit being configured to angular displace an angle of a selected wavelength on the switching axis such that the wavelength selected from multiple wavelength channels of an input port selected independently for each of the plurality of input/output port groups is transmitted to an output port of the plurality of input/output port groups selected independently.

The WSS apparatus according to the aspect of the present subject matter, further includes: a plurality of polarization diversity elements configured to split the light beams input thereto into at least two light beams with substantially the same polarization and arrange the at least two light beams on the dispersion axis.

In the WSS apparatus according to the aspect of the present subject matter, in the plurality of input/output port arrays a different number of input/output ports is assigned to different input/output port arrays.

In the WSS apparatus according to the aspect of the present subject matter, the path combining part includes a mirror element or a prism element.

The WSS apparatus according to the aspect of the present subject matter further includes a beam expansion part configured to expand a size of each of the plurality of light beams output from the path combining part.

Another aspect of the present subject matter is directed to a wavelength selective switch (WSS) apparatus that includes: a plurality of input/output port groups including a plurality of input/output port arrays which transmit a plurality of light beams each including a predetermined channel, the plurality of input/output port groups being separated from one another in a dispersion axis; a plurality of switching lens parts configured to converge the plurality of light beams transmitted from the plurality of input/output port arrays such that the plurality of light beams intersect on a switching axis; a path combining part which is placed after the plurality of switching lens parts and configured to combine the groups of the plurality of light beams transmitted from the switching lens parts on the dispersion axis; a wavelength dispersion part configured to disperse wavelength components of the light beams at different angles on the dispersion axis; an imaging optic part configured to readjust and focus the wavelengths of the light beams split by the wavelength dispersion part; and a switching unit including a plurality of surface areas corresponding to the plurality of input/output port groups, the switching unit being configured to angular displace an angle of a selected wavelength on the switching axis such that the wavelength selected from multiple wavelength channels of an input port selected independently for each of the plurality of input/output port groups is transmitted to an output port of the plurality of input/output port groups selected independently, wherein the plurality of I/O port groups are configured that the plurality of light beams output therefrom are tilted with respect to a horizontal line.

In the WSS apparatus according to the other aspect of the present subject matter, the path combining part includes a mirror element or a prism element.

The WSS apparatus according to the other aspect of the present subject matter further includes a beam expansion part configured to expand a size of each of the plurality of light beams output from the path combining part.

The WSS apparatus according to the other aspect of the present subject matter further includes a plurality of polarization diversity elements configured to split the light beams input thereto into at least two light beams with substantially the same polarization and arrange the at least two light beams on the dispersion axis.

In the WSS apparatus according to the other aspect of the present subject matter, in the plurality of input/output port arrays a different number of input/output ports is assigned to different input/output port arrays.

Still another aspect of the present subject matter is directed to a wavelength selective switch (WSS) apparatus that includes: a plurality of input/output port groups including a plurality of input/output port arrays which transmit a plurality of light beams each including a predetermined channel, the plurality of input/output port groups being separated from one another in a dispersion axis; a plurality of switching lens parts configured to converge the plurality of light beams transmitted from the plurality of input/output port arrays such that the plurality of light beams intersect on a switching axis; a plurality of wedge prism parts each of which is arranged between one of the plurality of input/ output port arrays and one of the plurality of switching lens parts, the plurality of wedge prism parts being configured to refract the plurality of light beams transmitted from the plurality of input/output port arrays into different angles on the switching axis according to groups to which the plurality of light beams belong; a wavelength dispersion part configured to disperse wavelength components of the light beams at different angles on the dispersion axis; an imaging optic part configured to readjust and focus the wavelengths of the light beams split by the wavelength dispersion part; and a switching unit including a plurality of surface areas corresponding to the plurality of input/output port groups, the switching unit being configured to angular displace an angle of a selected wavelength on the switching axis such that the wavelength selected from multiple wavelength channels of an input port selected independently for each of the plurality of input/output port groups is transmitted to an output port of the plurality of input/output port groups selected independently, wherein the plurality of VO port groups, the plurality of switching lens parts and the plurality of wedge prism parts are configured that the plurality of light beams output therefrom are tilted with respect to a horizontal line.

In the WSS apparatus according to still the other aspect of the present subject matter, each of the plurality of light beams output from the plurality of wedge prism parts is tilted at approximately 10 degrees or less with respect to a horizontal line.

The WSS apparatus according to still the other aspect of the present subject matter further includes a beam expansion part configured to expand a size of each of the plurality of light beams output from the switching lens.

The WSS apparatus according to still the other aspect of the present subject matter further includes a plurality of polarization diversity elements configured to split the light beams input thereto into at least two light beams with substantially the same polarization and arrange the at least two light beams on the dispersion axis.

In the WSS apparatus according to still the other aspect of the present subject matter, in the plurality of input/output port arrays a different number of input/output ports is assigned to different input/output port arrays.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a schematic view on a switching plane of a WSS structure with no wedge member according to an embodiment of the present subject matter wherein each input/output (I/O) port group is tilted with respect to a respective horizontal line.

FIG. 4A illustrates an example of using a mirror element as a path combining part on a dispersion plane according to an embodiment of the present subject matter and FIG. 4B illustrates another example of using a prism element as a path combining part on a dispersion plane according to an embodiment of the present subject matter.

DETAILED DESCRIPTION OF THE EMBODIMENTS

Figure 1:
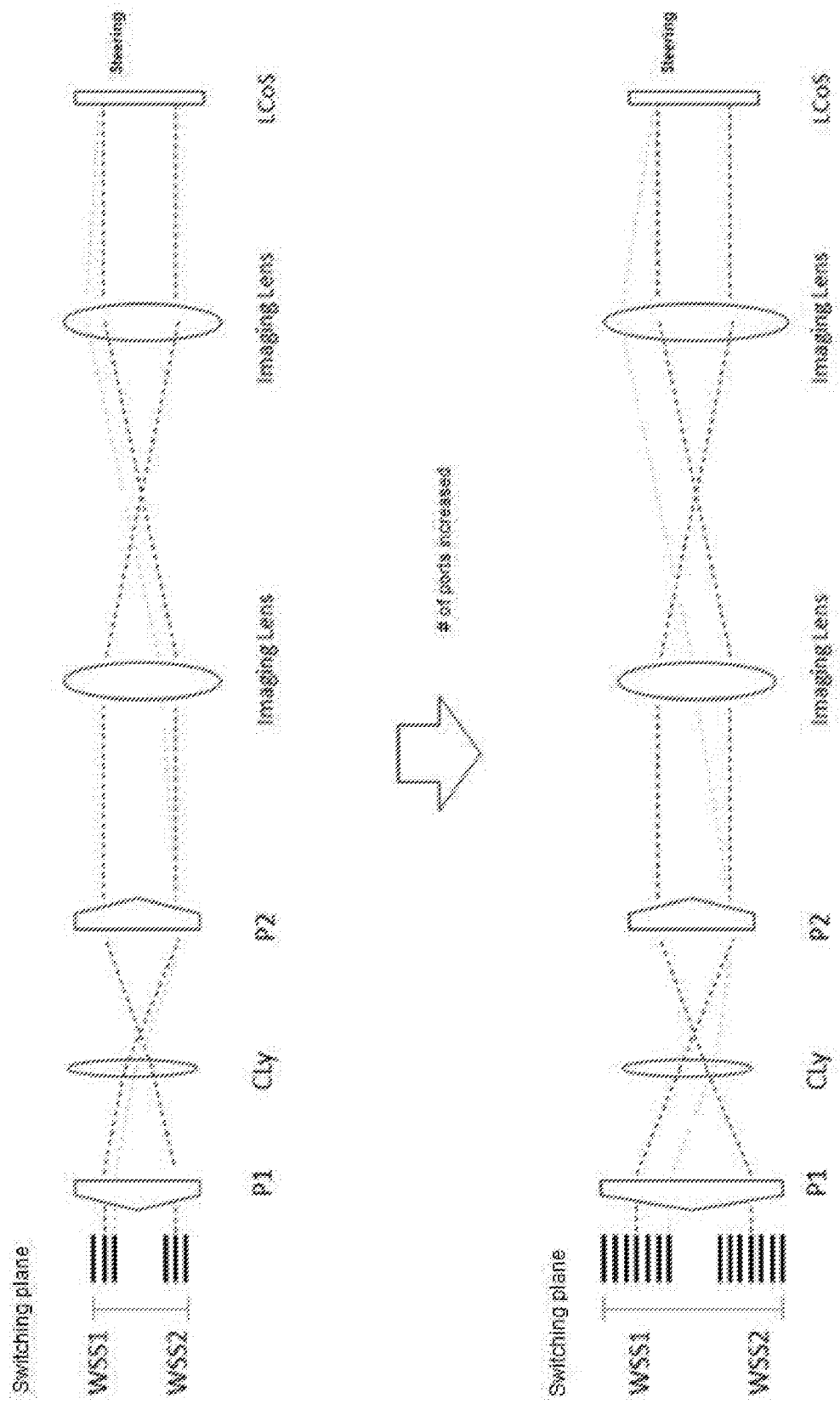
FIG. 1 is a schematic view on a switching plane of a wavelength selective switch (WSS) structure according to a related art, showing the increase in size of the WSS structure as the number of input/output ports is increased.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2A:
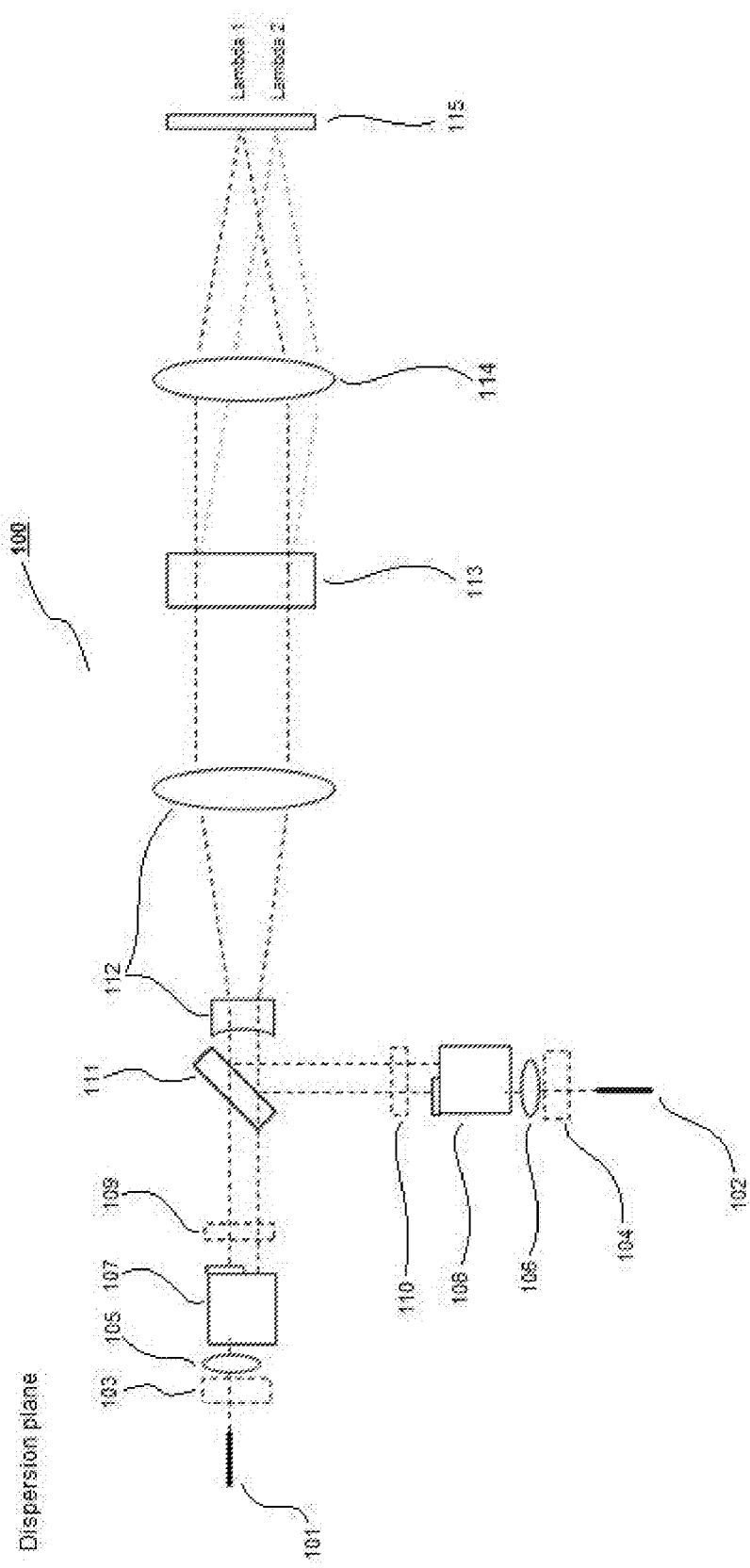
FIG. 2A is a schematic view on a dispersion plane of a WSS structure according to an embodiment of the present subject matter.
Figure 2B:
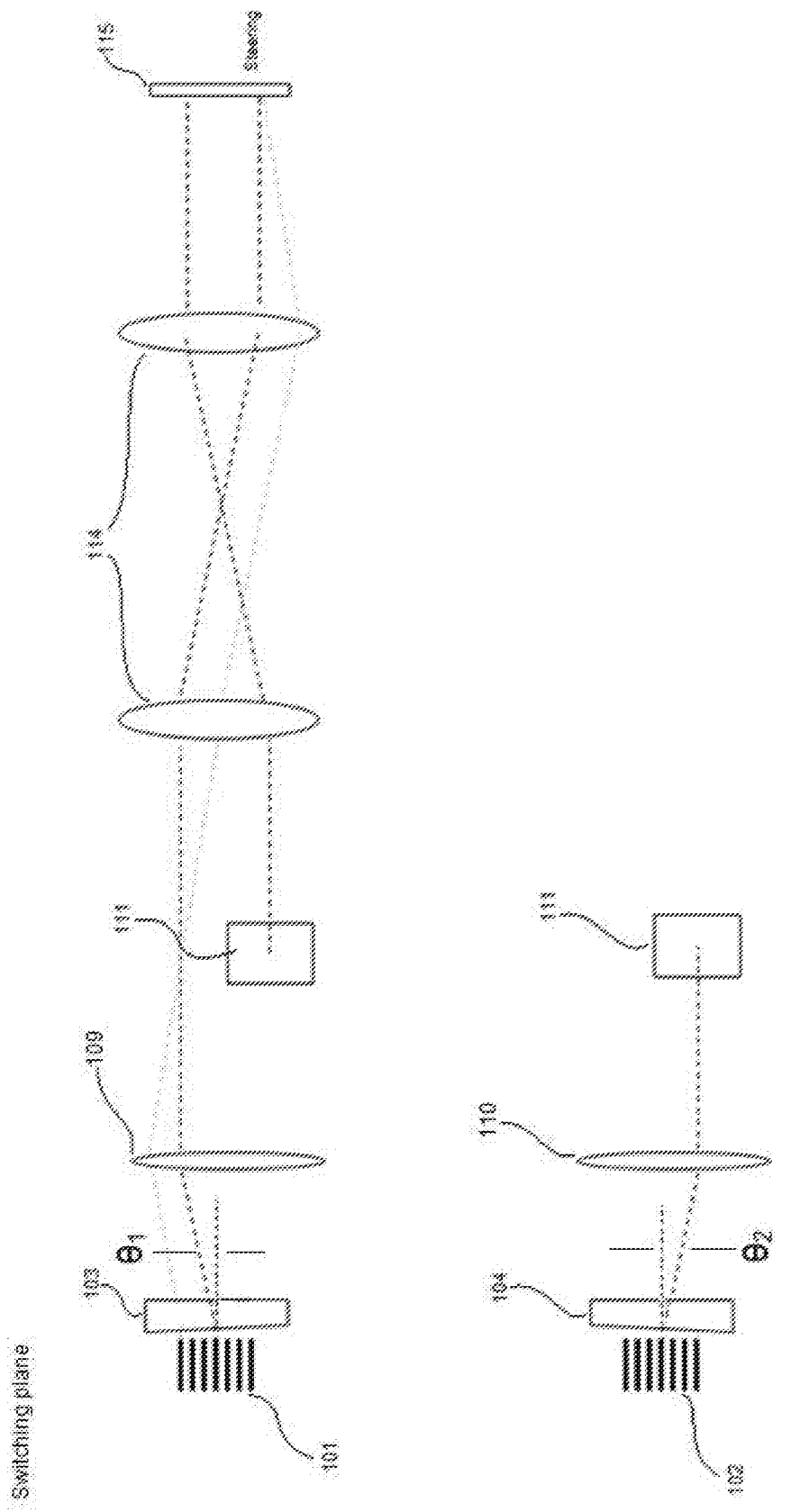
FIG. 2B is a schematic view of the WSS structure on a switching plane according to an embodiment of the present subject matter.

FIG. 2A is a schematic view of a wavelength selective switch (WSS) structure along a dispersion axis according to an embodiment of the present subject matter; and FIG. 2B is a schematic view of the WSS structure along a switching axis according to an embodiment of the present subject matter.

In FIG. 2A, a WSS apparatus 100 includes two input/output (VO) port groups 101, 102, two wedge prism parts 103, 104, two collimating lens parts 105, 106, two polarization diversity elements 107, 108, two switching lens parts 109, 110, a path combining part 111, a beam expansion part 112, a wavelength dispersion part 113, an imaging optic part 114, and a switching unit 115.

In FIGS. 2A and 2B, a first light beam output from a first I/O port group 101 of the two I/O port groups 101, 102 enters a first wedge prism 103 of the two wedge prism parts 103, 104, which is a prism with a shallow angle between its input and output surfaces. For the sake of simplification, some elements are illustrated only In one of FIGS. 2A and 2B while being omitted in the other one of FIGS. 2A and 2B. The first wedge prism 103 deviates the incident beam by a first deviation angle $\theta_1$ on the switching axis. The light beam output from the first wedge prism 103 and is then collimated by a first collimating lens part 105 of the two collimating lens parts 105, 106 and then passes through a first polarization diversity element 107 of the two polarization diversity elements 107, 108. The light beam output from the first polarization diversity element 107 has substantially a same polarization and enters a first switching lens part 109 of the two switching lens parts 109, 110. Then, this light beam enters and passes through a path combining part 111 toward a beam expansion part 112 such as a prism pair or a cylindrical lens pair. In the beam expansion part 112, the light beam experiences expansion in size. The expanded beam then enters a wavelength dispersion part 113 such as a diffraction grating which disperses the wavelength components of each input beam. Here, the wavelength dispersion part 113 disperses different wavelength components at different angles on the dispersion axis. The dispersed light beam enters an imaging optic part 114 where the beam refracts towards a switching unit 115. The switching unit 115 includes multiple surface areas corresponding to the multiple I/O port groups 101, 102. The switching unit 115 is configured to angular displace an angle of a selected wavelength on the switching axis in such a way that the wavelength selected from multiple wavelength channels of an input port selected independently for each of the multiple VO port groups 101, 102. The structure of the switching unit 115 is disclosed in FIG. 3. Also, the structural and functional aspects of a switching unit having multiple surface areas are illustrated and described in U.S. Pat. No. 9,521,474, issued on Dec. 13, 2016, which is incorporated herein by reference.

Meanwhile, as shown in FIG. 2A, a second I/O port group 102 of the two I/O port groups 101, 102 is arranged in such a way that the first light beam output from the first I/O port group 101 is normal to a second light beam output from the second I/O port group 102. Referring to FIGS. 2A and 2B, the second light beam output from the second I/O port group 102 of the two I/O port groups 101, 102 enters a second wedge prism 104 of the two wedge prism parts 103, 104, which is a prism with a shallow angle between its input and output surfaces. The second wedge prism 104 deviates the incident beam by a second deviation angle $\theta_2$ on the switching axis. The light beam output from the second wedge prism 104 is then collimated by a second collimating lens part 106 of the two collimating lens parts 105, 106 and then passes through a second polarization diversity element 108 of the two polarization diversity elements 107, 108. The light beam output from the second polarization diversity element 108 has substantially a same polarization and enters a second switching lens part 110 of the two switching lens parts 109, 110. Then, this light beam enters and passes through the path combining part 111 toward the beam expansion part 112. The paths of the light beams output from the path combining part 111 become the same or similar on the dispersion axis. In the beam expansion part 112, the light beam experiences expansion in size. The expanded beam then enters the wavelength dispersion part 113 which disperses the wavelength components of each input beam. Here, the wavelength dispersion part 113 disperses different wavelength components at different angles on the dispersion axis. The dispersed light beam enters the imaging optic part 114 where the beam refracts towards the switching unit 115.

FIG. 3 is a schematic view on a switching plane of a WSS structure with no wedge member according to an embodiment of the present subject matter wherein each input/output (I/O) port group is tilted with respect to a respective horizontal line.

FIG. 3 provides a structure similar to that shown in FIG. 2B except that it does not include two wedge prism parts 103, 104 while the first and second I/O port groups 101, 102 are respectively tilted with respect to the horizontal line. The structure shown in FIG. 3 draws similar effects as that of FIG. 2B.

FIG. 4A illustrates an example of using a mirror element as a path combining part on a dispersion plane according to an embodiment of the present subject matter and FIG. 4B illustrates another example of using a prism element as a path combining part on a dispersion plane according to an embodiment of the present subject matter.

The path combining part 111 may be constituted as a mirror element 111-1 as shown in FIG. 4A or a prism element 111-2 as shown in FIG. 4B.

Figure 5:
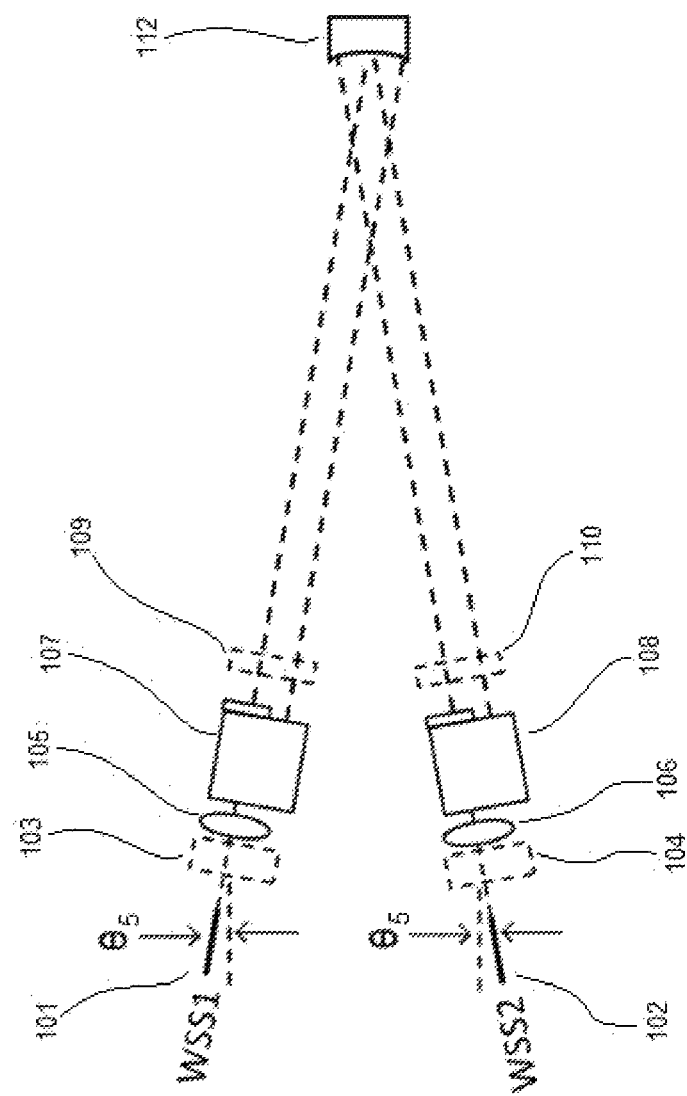
FIG. 5 is a partial schematic view on a dispersion plane of a WSS structure with no path combining part according to an embodiment of the present subject matter wherein each input/output (I/O) port group is tilted with respect to a respective horizontal line.

FIG. 5 is a partial schematic view on a dispersion plane of a WSS structure with no path combining part according to an embodiment of the present subject matter wherein each input/output (I/O) port group is tilted with respect to a respective horizontal line.

In FIG. 5, the WSS structure does not include a path combining part 111. Instead, the two I/O port groups 101, 102 of the WSS structure are respectively tilted with respected to a horizontal line. The tilt angle $\theta_5$, $\theta_6$ with respect to the horizontal line is preferably 10 degrees or less. The structure shown In FIG. 5 draws similar effects as that of FIG. 2B.

Figure 6B:
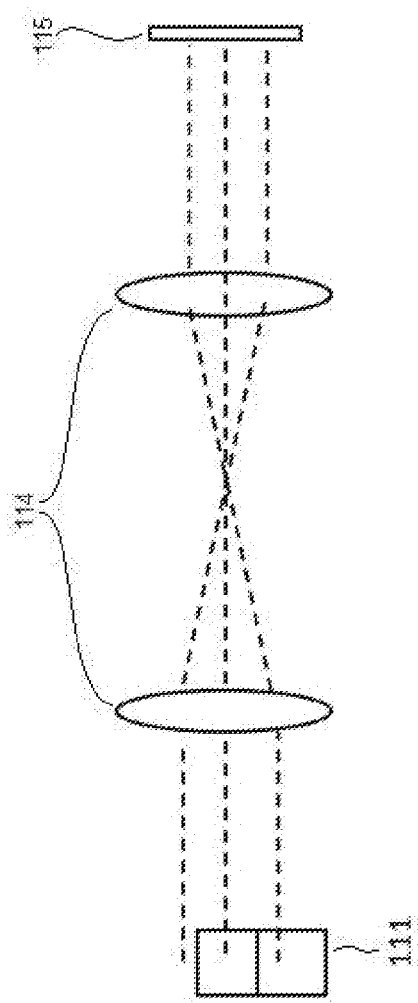
FIG. 6B is a partial schematic view on a switching plane of a WSS structure with three or more input/output (I/O) port groups according to an embodiment of the present subject matter.
Figure 6A:
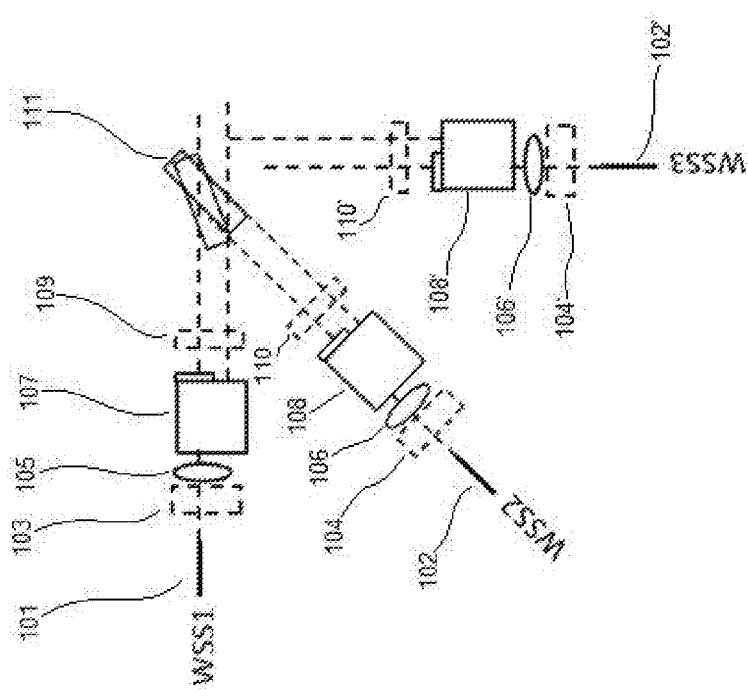
FIG. 6A is a partial schematic view on a dispersion plane of a WSS structure with three or more input/output (VO) port groups according to an embodiment of the present subject matter.

FIG. 6A is a partial schematic view on a dispersion plane of a WSS structure with three or more input/output (I/O) port groups according to an embodiment of the present subject matter; and FIG. 6B is a partial schematic view on a switching plane of a WSS structure with three or more input/output (I/O) port groups according to an embodiment of the present subject matter.

As shown in FIG. 6A, the path combining part 111 combines the beam paths from/to the three I/O port groups 101, 102, 102'. The light beams pass through the path combining part 111 propagate in parallel in a direction to the switching unit 115 via the optic part 114. In this manner, the WSS structure may include three or more VO port groups (or three or more WSS).

Figure 7:
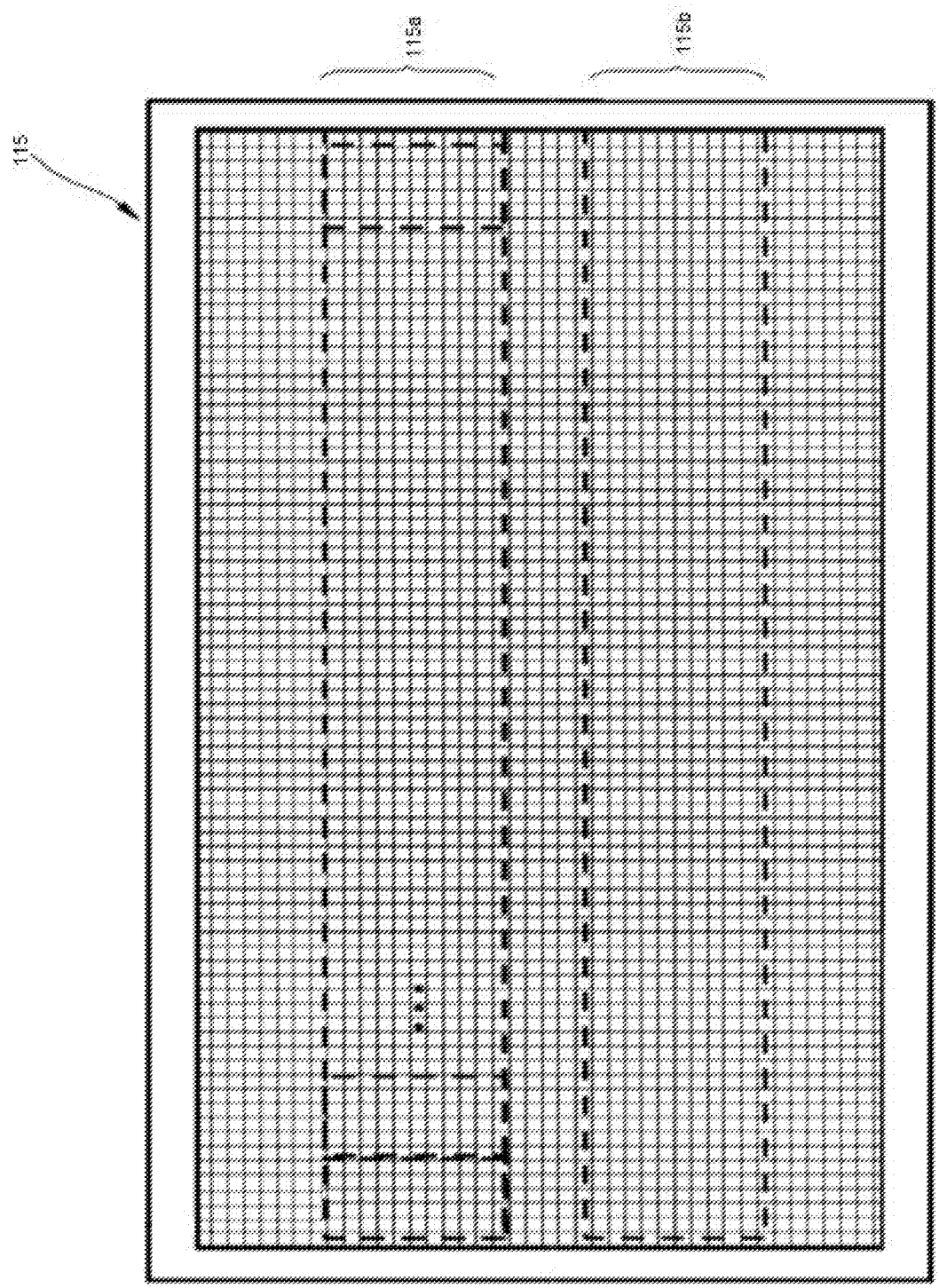
FIG. 7 is a schematic view of a switching unit provided with a plurality of surface areas.

In FIG. 7, the switching unit 115 includes two surface areas, namely, a first surface area 115a and a second surface area 115b, corresponding to the first I/O port group 101 and the second I/O port group 102, respectively. The switching unit 115 is configured to angular displace an angle of a selected wavelength on the switching axis such that the wavelength selected from multiple wavelength channels of an input port selected independently for each of the first and second I/O port groups 101, 102 is transmitted to an output port of one of the two I/O port groups 101, 102 selected independently. By contrast, unselected wavelength components are output from the switching unit 115 at such angles that the light beams of such wavelength components do not reach at an output port(s) of the two I/O port groups 101, 102. Hence, a light beam having a selected wavelength is reflected from the surface of the switching unit 115 and travels back towards a predetermined output port(s) in the first I/O port group 101 and/or the second I/O port group 102.

As shown in FIGS. 2A and 2B, a light beam with a selected wavelength travels back from the switching unit 115 towards an output port(s) of the first and/or second I/O port groups 101, 102 via the imaging optic part 114, the wavelength dispersion part 113, the beam expansion part 112, the path combining part 111, the first and/or second switching lens parts 109, 110, the first and/or second polarization diversity elements 107, 108, the first and/or second collimating lens parts 105, 106, and the first and/or second wedge prism parts 103, 104.

Figure 8A:
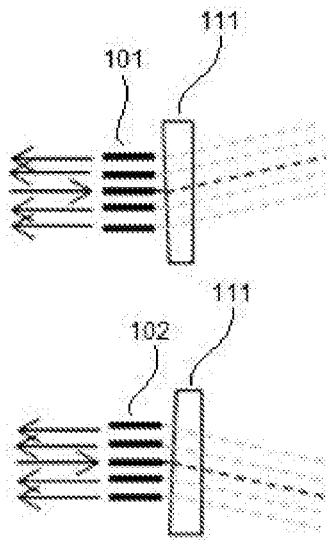
FIG. 8A is a schematic view of a first exemplary arrangement of an input port(s) and an output port(s) in each input/output (I/O) port group according to an embodiment of the WSS structure of the present subject matter.
Figure 8B:
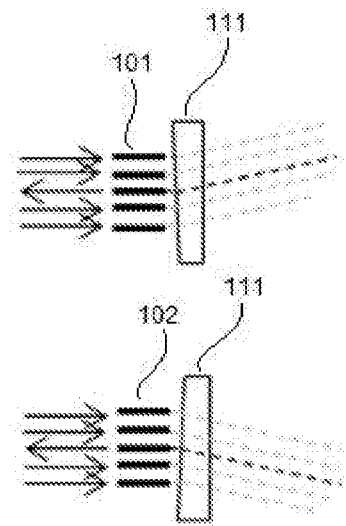
FIG. 8B is a schematic view of a second exemplary arrangement of an input port(s) and an output port(s) in each I/O port group according to an embodiment of the WSS structure of the present subject matter.
Figure 8C:
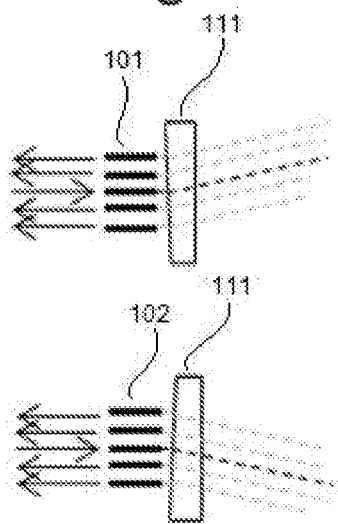
FIG. 8C is a schematic view of a third exemplary arrangement of an input port(s) and an output port(s) in each/O port group according to an embodiment of the WSS structure of the present subject matter.

FIG. 8A is a schematic view of a first exemplary arrangement of an input port(s) and an output port(s) in each input/output (I/O) port group according to an embodiment of the WSS structure of the present subject matter; FIG. 8B is a schematic view of a second exemplary arrangement of an input port(s) and an output port(s) in each I/O port group according to an embodiment of the WSS structure of the present subject matter; FIG. 8C is a schematic view of a third exemplary arrangement of an input port(s) and an output port(s) in each I/O port group according to an embodiment of the WSS structure of the present subject matter; and FIG. 8D is a schematic view of a fourth exemplary arrangement of an input port(s) and an output port(s) in each I/O port group according to an embodiment of the WSS structure of the present subject matter.

Figure 8D:
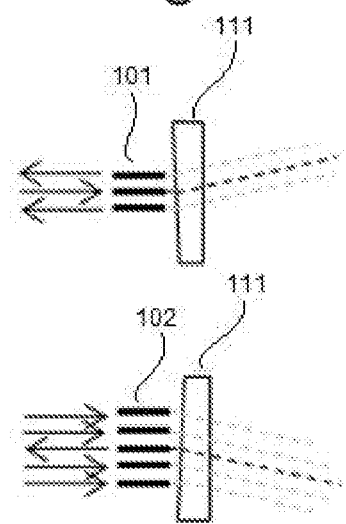
FIG. 8D is a schematic view of a fourth exemplary arrangement of an input port(s) and an output port(s) in each I/O port group according to an embodiment of the WSS structure of the present subject matter.

In FIGS. 8A-8D, the I/O port group 101 has two or more ports while the I/O port group 102 has two or more ports, where the number of the ports in the I/O port group 101 can be the same as or different from the number of the ports in the I/O port group 102. In FIG. 8A, each I/O port group 101, 102 has an input port and 4 output ports. In FIG. 8B, the I/O port group 101 has an input port and 4 output ports while the I/O port group 102 has 4 input ports and an output port. In FIG. 8C, each I/O port group 101, 102 has 4 input ports and an output port. In FIG. 8D, the I/O port group 101 has an input port and 2 output ports while the I/O port group 102 has 4 input ports and an output port.

As such, the WSS apparatus as explained and illustrated herein can select specific wavelength components of light beams by controlling multiple pixel layers formed on a reflector. Thus, the WSS apparatus according to the present subject matter does not require any electro-mechanical switching to select desired wavelength components of beams at an output side, thereby significantly reducing leakage losses of light beams that would otherwise happen in switching motions. In addition, the WSS apparatus according to the present subject matter prevents an unnecessary increase in size along a particular axis.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A wavelength selective switch (WSS) apparatus comprising:
   a plurality of input and output port groups including a plurality of input and output port arrays which transmit a plurality of light beams each including a predetermined channel, the plurality of input and output port groups being separated from one another in a dispersion axis;
   a plurality of switching lens parts configured to converge the plurality of light beams transmitted from the plurality of input and output port arrays allowing the plurality of light beams to intersect on a switching axis;
   a plurality of wedge prism parts each of which is arranged between one of the plurality of input and output port arrays and one of the plurality of switching lens parts, the plurality of wedge prism parts being configured to refract the plurality of light beams transmitted from the plurality of input and output port arrays into different angles on the switching axis according to groups to which the plurality of light beams belong;
   a path combining part which is placed after the plurality of switching lens parts and configured to combine the groups of the plurality of light beams transmitted from the switching lens parts on the dispersion axis;
   a wavelength dispersion part configured to disperse wavelength components of the light beams at different angles on the dispersion axis;
   an imaging optic part configured to readjust and focus the wavelengths of the light beams split by the wavelength dispersion part; and
   a switching unit including a plurality of surface areas corresponding to the plurality of input and output port groups, the switching unit being configured to angular displace an angle of a selected wavelength on the switching axis allowing the wavelength selected from multiple wavelength channels of an input port selected independently for each of the plurality of input and output port groups to be transmitted to an output port of the plurality of input and output port groups selected independently.

2. The WSS apparatus according to claim 1, wherein in the plurality of input and output port arrays a different number of input and output ports is assigned to different input and output port arrays.

3. The WSS apparatus according to claim 1, wherein the path combining part includes a mirror element or a prism element.

4. The WSS apparatus according to claim 1, further comprising a beam expansion part configured to expand a size of each of the plurality of light beams output from the path combining part.

5. A wavelength selective switch (WSS) apparatus comprising:
   a plurality of input and output port groups including a plurality of input and output port arrays which transmit a plurality of light beams each including a predetermined channel, the plurality of input and output port groups being separated from one another in a dispersion axis;

a plurality of switching lens parts configured to converge the plurality of light beams transmitted from the plurality of input and output port arrays allowing the plurality of light beams to intersect on a switching axis;

a path combining part which is placed after the plurality of switching lens parts and configured to combine the groups of the plurality of light beams transmitted from the switching lens parts on the dispersion axis;

a wavelength dispersion part configured to disperse wavelength components of the light beams at different angles on the dispersion axis;

an imaging optic part configured to readjust and focus the wavelengths of the light beams split by the wavelength dispersion part; and a switching unit including a plurality of surface areas corresponding to the plurality of input and output port groups, the switching unit being configured to angular displace an angle of a selected wavelength on the switching axis allowing the wavelength selected from multiple wavelength channels of an input port selected independently for each of the plurality of input and output port groups to be transmitted to an output port of the plurality of input and output port groups selected independently, wherein the plurality of I/O port groups are configured that the plurality of light beams output therefrom are tilted with respect to a horizontal line.

6. The WSS apparatus according to claim 5, wherein the path combining part includes a mirror element or a prism element.

7. The WSS apparatus according to claim 5, further comprising a beam expansion part configured to expand a size of each of the plurality of light beams output from the path combining part.

8. The WSS apparatus according to claim 5, wherein in the plurality of input and output port arrays a different number of input and output ports is assigned to different input and output port arrays.

9. A wavelength selective switch (WSS) apparatus comprising:

a plurality of input and output port groups including a plurality of input and output port arrays which transmit a plurality of light beams each including a predetermined channel, the plurality of input and output port groups being separated from one another in a dispersion axis;

a plurality of switching lens parts configured to converge the plurality of light beams transmitted from the plurality of input and output port arrays allowing the plurality of light beams to intersect on a switching axis;

a plurality of wedge prism parts each of which is arranged between one of the plurality of input and output port arrays and one of the plurality of switching lens parts, the plurality of wedge prism parts being configured to refract the plurality of light beams transmitted from the plurality of input and output port arrays into different angles on the switching axis according to groups to which the plurality of light beams belong;

a wavelength dispersion part configured to disperse wavelength components of the light beams at different angles on the dispersion axis;

an imaging optic part configured to readjust and focus the wavelengths of the light beams split by the wavelength dispersion part; and a switching unit including a plurality of surface areas corresponding to the plurality of input and output port groups, the switching unit being configured to angular displace an angle of a selected wavelength on the switching axis allowing the wavelength selected from multiple wavelength channels of an input port selected independently for each of the plurality of input and output port groups to be transmitted to an output port of the plurality of input and output port groups selected independently, wherein the plurality of I/O port groups, the plurality of switching lens parts and the plurality of wedge prism parts are configured that the plurality of light beams output therefrom are tilted with respect to a horizontal line.

10. The WSS apparatus according to claim 9, wherein each of the plurality of light beams output from the plurality of wedge prism parts is tilted at approximately 10 degrees or less with respect to a horizontal line.

11. The WSS apparatus according to claim 9, further comprising a beam expansion part configured to expand a size of each of the plurality of light beams output from the switching lens.

12. The WSS apparatus according to claim 9, wherein in the plurality of input and output port arrays a different number of input and output ports is assigned to different input and output port arrays.

* * * * *